UNITED STATES PATENT OFFICE.

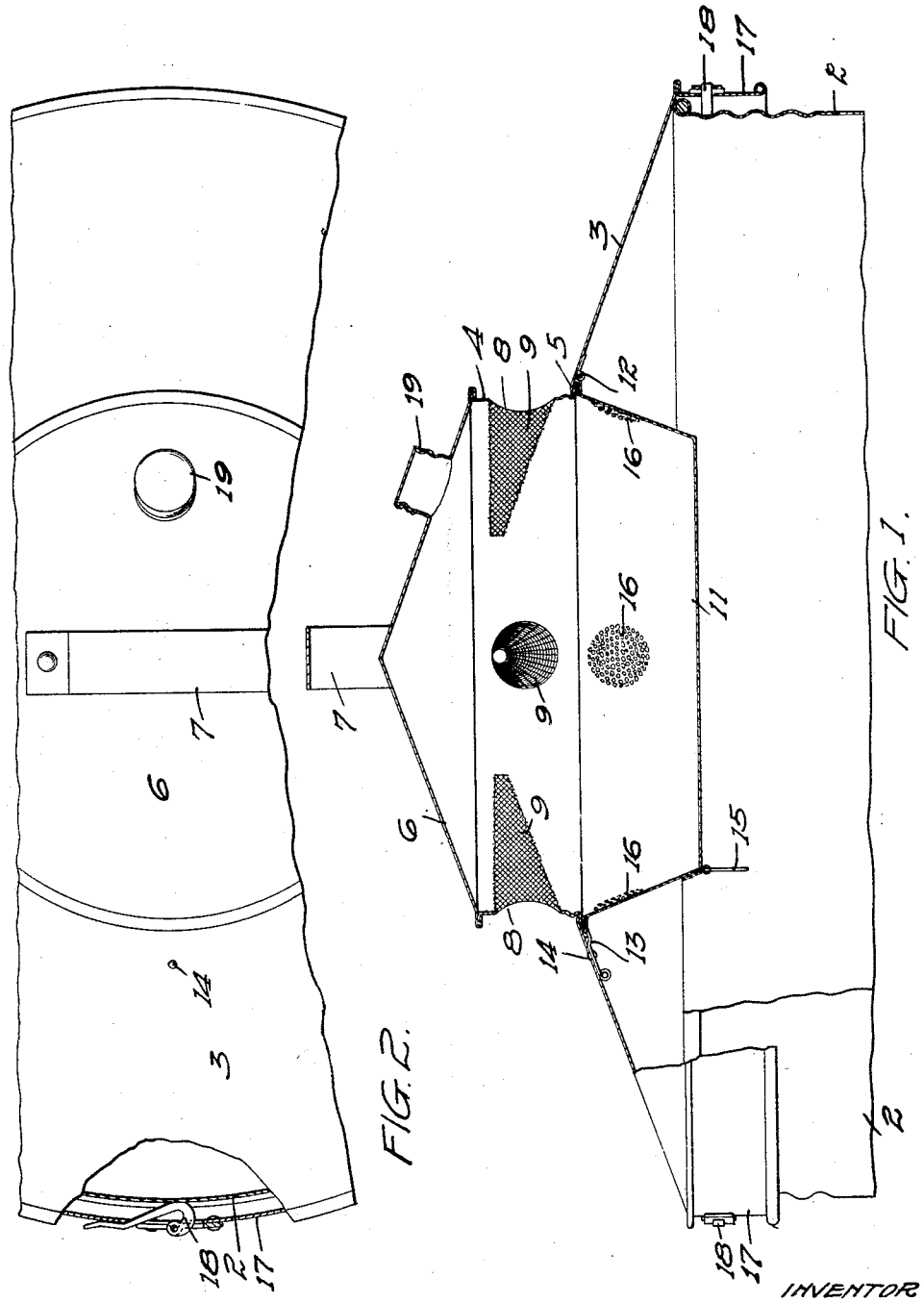

ABRAHAM SHAPIRO, OF MINNEAPOLIS, MINNESOTA.

INSECT-TRAP ATTACHMENT FOR GARBAGE-CANS.

1,114,191. Specification of Letters Patent. Patented Oct. 20, 1914.

Application filed July 10, 1913. Serial No. 778,311.

*To all whom it may concern:*

Be it known that I, ABRAHAM SHAPIRO, a citizen of the United States, resident of Minneapolis, in the county of Hennepin, State of Minnesota, have invented certain new and useful Improvements in Insect-Trap Attachments for Garbage-Cans, of which the following is a specification.

The object of my invention is to provide a device adapted to be mounted on the cover of a garbage can for the purpose of ventilating the can and at the same time affording a means for trapping flies and other insects.

A further object is to provide a device of simple, economical construction and one which can be applied to the cover of a garbage can with comparatively little expense.

The invention consists generally in various constructions and combinations, all as hereinafter described and particularly pointed out in the claims.

In the accompanying drawings forming part of this specification, Figure 1 is a sectional view through the upper portion of a garbage can with my invention applied thereto, Fig. 2 is a partial plan view, illustrating the means for locking the cover on the can.

In the drawing, 2 represents the upper portion of a garbage can having the usual beaded upper edge and corrugated or ribbed walls.

3 is the cover of the can, having a central opening therein in which a ring 4, preferably of sheet metal, is inserted and provided with an outwardly turned, flanged lower edge 5 that is arranged to lap by the edge of the cover around the opening therein. This ring has an imperforate top 6 provided with a suitable handle 7. At intervals in the ring I provide a series of openings 8 into which substantially cone-shaped members 9 are inserted. These members are composed, preferably, of wire mesh and are open at each end, the upper walls being preferably straight while the lower walls thereof are inclined or tapered and verging from the comparatively large outer opening to the comparatively small inner opening. There may be any suitable number of these cone-shaped members. A pan 11 is suspended beneath the opening in the cover by any suitable means, preferably by hinging it on one side, as at 12, and providing a clip 13 on the other side, pivoted at 14, and having one end adapted to swing in under the flange at the top of the pan and lock it between the clip and the flange of the ring above. When this clip is swung to an inoperative position the pan may be dropped on its hinge to expose its contents. A suitable finger grip 15 is provided on the wall of the pan. The pan has a series of openings therein and screens 16 covering said openings. The cover has the usual flange 17 encircling the upper portion of the can and in this flange cam levers 18 are mounted, which are adapted to engage the wall of the can and lock the cover securely thereon. Through the holes in the pan and the cover the contents of the can will be ventilated and it will not be possible for flies or other insects to reach the contents of the can and carry the disease germs which may have accumulated therein to some other point. The odor of the decayed matter in the can will pass up through the pan and cover and will attract the flies and other insects which, upon crawling through the cones 9, will be trapped and unable to escape. Any suitable insect poison may be placed in the pan or whenever desired the cover may be removed from the can and boiling water poured therein, or the cover may be entirely immersed in water until the insects are destroyed.

The top 6 is preferably provided with a removable cap 19 to permit boiling water to be poured into the pan, if preferred, instead of immersing the pan in the water. This top being closed will be waterproof and prevent the entrance of moisture into the garbage can.

I claim as my invention:—

1. The combination, with a can and a cover therefor provided with openings therein, and perforated cones open at each end fitting within said openings, and a receptacle having perforated walls supported by said cover beneath said cones.

2. The combination, with a can and a cover therefor, of an insect trap mounted therein, said trap comprising an upper portion extending above the cover and having a closed top and openings in its side walls, and perforate cones fitting said openings, said cones being open at each end, and a receptacle hinged on said cover beneath said cones and having perforate walls.

3. The combination, with a can and a cover therefor provided with an opening therein, of a pan suspended beneath said opening and a part raised above said cover and having openings therein through which insects may enter said pan.

4. The combination, with a can and a cover therefor provided with a central opening, of a pan hinged on one side beneath said opening, means for locking said pan in its raised position to close said opening, means surmounting said pan and having openings therein through which insects may enter the pan, said pan being adapted to contain an insect poison.

5. The combination, with a garbage can and a cover therefor, of an insect trap mounted in said cover and comprising a receptacle supported by said cover and having openings communicating with said can to allow the passage of odors from said can to said receptacle, said openings being too small to allow the passage of insects into said can and a perforate cone leading from the outer air into said trap.

In witness whereof, I have hereunto set my hand this 25" day of June, 1913.

ABRAHAM SHAPIRO.

Witnesses:
GENEVIEVE E. SORENSEN,
C. H. REHFUSS.

Copies of this patent may be obtained for five cents each, by addressing the "Commissioner of Patents, Washington, D. C."